United States Patent [19]

Vara

[11] Patent Number: 5,531,333

[45] Date of Patent: Jul. 2, 1996

[54] STORAGE SYSTEM FOR ELECTRICAL APPLIANCES, POWERCORDS AND ADAPTERS

[76] Inventor: James E. Vara, 8514 Londonderry Ave., Dallas, Tex. 75228

[21] Appl. No.: 325,039

[22] Filed: Oct. 18, 1994

[51] Int. Cl.⁶ .................................................. A47F 5/00
[52] U.S. Cl. ........................... 211/13; 248/51; 248/52; 211/26; 211/70.6; 242/395; 242/395.1; 242/405.1
[58] Field of Search ........................... 242/395, 395.1, 242/402, 404.1, 404.3, 405, 406, 407, 405.1; 211/26, 70.6, 189; 248/205.2, 51, 52, 13

[56] References Cited

U.S. PATENT DOCUMENTS

| | | | |
|---|---|---|---|
| 1,910,597 | 5/1933 | Elliott | 242/404.3 |
| 2,438,188 | 3/1948 | Thwowa | 242/395 X |
| 2,449,464 | 9/1948 | Eypper | 24/51.3 |
| 2,938,514 | 5/1960 | Berg | 124/24 |
| 3,044,732 | 7/1962 | Simonds | 242/395.1 |
| 3,585,324 | 6/1971 | Renndorfer et al. | 200/52 |
| 3,705,697 | 12/1972 | Chagnon | 242/85 |
| 3,809,331 | 5/1974 | Gaul | 242/100.1 |
| 3,906,236 | 9/1975 | Sims | 242/85.1 |
| 4,585,194 | 4/1986 | Schwob | 248/52 |
| 5,388,877 | 2/1995 | Wonk | 242/395.1 X |

OTHER PUBLICATIONS

(Unknown) Grainger Industrial Equipment and Commercial Equipment and Supplies; 1994 GENERAL CATALOG No. 385; W. W. Grainger, Inc. 2639 Main St., Dallas, TX 75226–1411; Catalog pp. —#850 through 853; "Cord reels, cord reel lights, and Hand Rewind Reels" 1994.

James E. Vara, Inventor —"Confidential Invention Disclosure Form" (in nine (9) pages including its attached sketches, sheets 1 through 5), signed by James E. Vara, Inventor. Mar. 22, 1993.

*Primary Examiner*—Robert W. Gibson, Jr.
*Attorney, Agent, or Firm*—Charles C. Garner

[57] ABSTRACT

A storage system is provided for interfaced storage of powercords with electric appliances and electric adapters. The system comprises an powercord storage tool and an appliance storage bin rack. The powercord storage tool provides means for gripping, winding and retaining an electrical powercord; means for interfacing with and attaching to said electrical appliance; and means for interfacing and attaching to said appliance storage bin rack; as removable means for receiving, handling and retaining an electrical appliance and its powercord, for typical small electrical appliances, without change or modification to the appliance. The storage bin comprises a container for holding the appliance, and a rack for holding and retaining the powercord storage tool. The storage tool includes a retaining member comprising a pair of flanges attached one to each end of said retaining member. One of said flanges is rotatably attached to the end of said retaining member by pivot pin. Said retaining member and one of said flanges may be rotated about said pivot pin with respect to the other flange, by manually rotating a knob. The integral storage tool may be attached either to its appliance, or alternately to a storage bin rack on which its appliance may be also stored for good order and ease of access, and means for orderly storage.

6 Claims, 4 Drawing Sheets

STORAGE SYSTEM FOR ELECTRICAL APPLIANCES, POWERCORDS AND ADAPTERS

TECHNICAL FIELD

This invention relates to electrical power tools, and in particular to a system of storage devices for receiving, handling, and storing small electrical and electronic appliances, including their powercords and adapters.

BACKGROUND OF THE INVENTION

Millions of small electrical appliances are in use in industrialized society, not only in industry but in offices, schools, and households, as well. There is proliferation of hair dryers, razors, hair clippers, curling irons, nail polishers, electric toothbrushes, irons, drills, glue guns, sprayers, mixers, electric knifes, slicers, and the like. Each appliance requires its own loose powercord. There is also proliferation of a new generation of very small electronic appliances such as cassette players, CD-ROM drives, cellular telephones, desktop and laptop computers, computer games, game controls, recharging devices, converters, adapters, and interface modules, each requiring a powercord. Many very small appliances require a converter, adapter or recharger which is most often affixed not to the appliance but to the powercord, to eliminate bulk from the appliance. Portable computers comprise separate portable modules, disc drives, modems, and interface terminals, which require cords and adapters of various configurations.

Often within a household, each person has his and her own personal assortment of electric and electronic appliances, including personal hair dryer, razor, electric toothbrush, calculator, cassette player, CD drive, game cartridges, game controls, and headsets. Young persons especially are more and more equipped with myriads of small appliances, electronic toys, games, game consoles, game controls, music devices, and gadgets requiring powercords, adapters, converters, and recharging devices. This results in household drawers and boxes of appliances, electronic devices, powercords and adapters.

Each appliance requires its own loose powercord. None has been found to disclose a storage system comprising interfaced, detachable storage tool with storage bin shelf for retention and storage of appliances, cords, and storage modules in an orderly manner.

As the pace of life accelerates, there is increasing necessity to minimize the clutter of small appliances with loose cords and adapters. Yet, prior to this disclosure, nothing had been disclosed to solve the problem. Drawers of powercords, adapters and appliances continue to grow. An executive in one company that manufactures small appliances has commented that one problem in the industry is the nightmare of what to do with the maze of assorted powercords. A need exists for system, apparatus and methods for efficient handling of small appliances, powercords and adapters.

SUMMARY OF THE INVENTION

In accordance with one aspect of the present invention, a storage system comprising an interfaced-detachable storage tool device, storage bin, and rack, is provided to reel-in and store the cord of an electrical appliance, and to hold and store the appliance and adapter, all efficiently stored in and on the storage bin rack. The cord storage module, with cord stored thereon, fits and matches the appliance for which it is selected, without modification or physical change to the appliance. The module may be interfaced with and re-attached to its appliance by quick-acting, hook-and-loop straps, thus keeping each cord efficiently with its appliance.

In an another aspect of the present invention, the interfaced, hand-held storage tool with powercord wound thereon, is capable of efficient storage within a storage bin and attachment to a rack, by rails located on one flange of the storage tool. The rail, or equivalent attachment means, interfaces with a rack such as a series of matching slots, or equivalent attachment hardware, on the rack.

In accordance with a third aspect of this invention, the storage tool with powercord wound thereon may be interfaced and attached to its respective appliance as a unit, with said unit being capable of efficient storage in, and attachment to, a special storage bin rack.

In accordance with a fourth aspect of this invention, this interface-attached and detachable, hand-held storage tool with powercord wound thereon, may be attached alternately, either to the appliance, or to the storage rack for good order and ease of access.

BRIEF DESCRIPTION OF THE DRAWINGS

A more complete understanding of the Invention can be had by referring to the following Detailed Description, taken with the accompanying drawings, wherein.

DETAILED DESCRIPTION

Figure 1A:
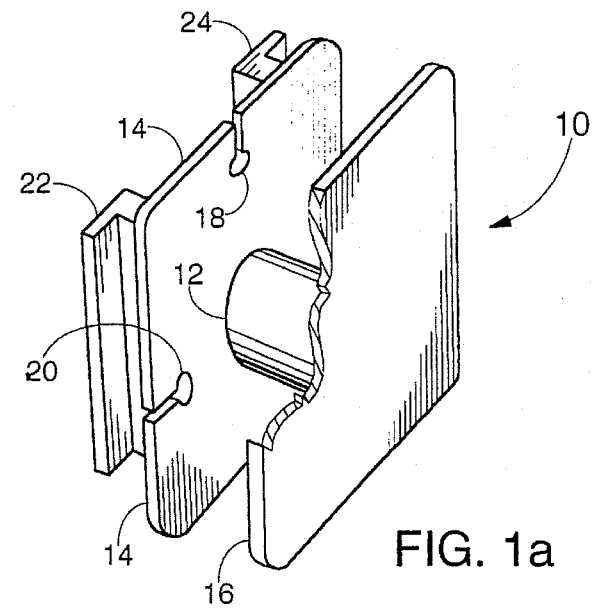
FIG. 1*a* an isometric perspective view of non-rotating storage tool 10 forming one embodiment of the present invention.

Referring now to the drawings, wherein like reference numerals designate like or corresponding parts throughout the several views; in FIG. 1a, there is illustrated a storage tool 10 forming one embodiment of the present invention, but empty, i.e. without powercord.

Figure 5:
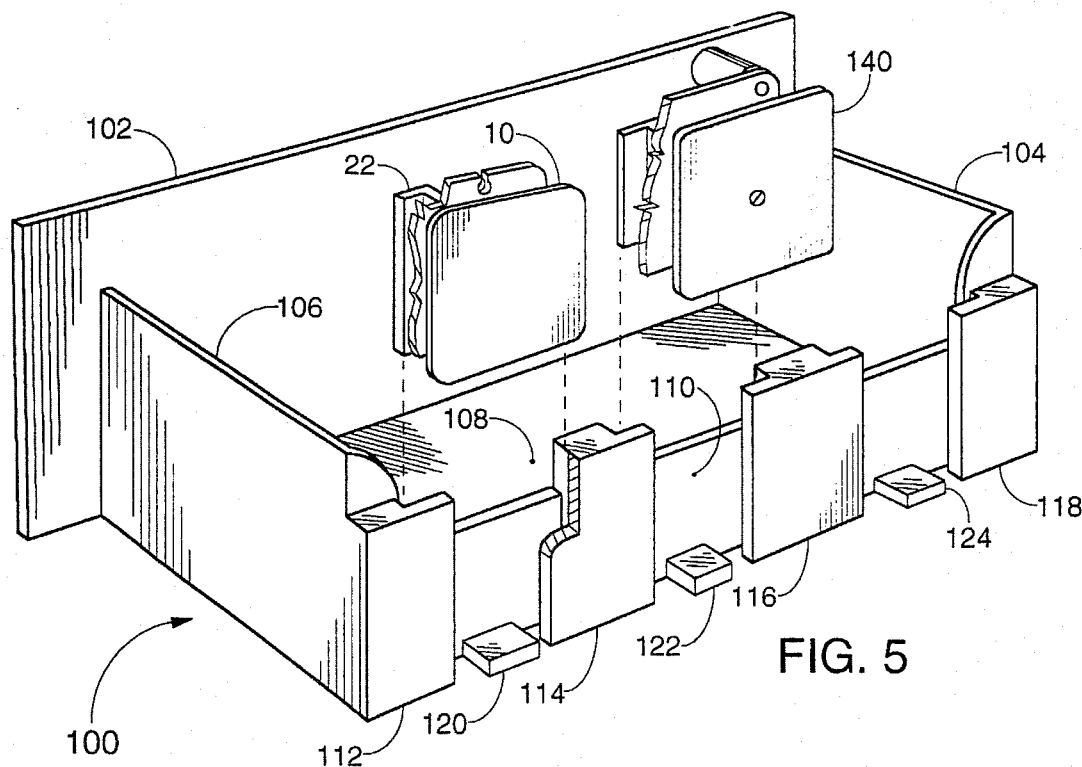
FIG. 5 is an isometric perspective view of storage bin rack 100 as another aspect of this invention, shown empty, showing the bin and rack which can hold, store and interface with typical appliances and with rail-bracket rails of said storage tools.
Figure 6:
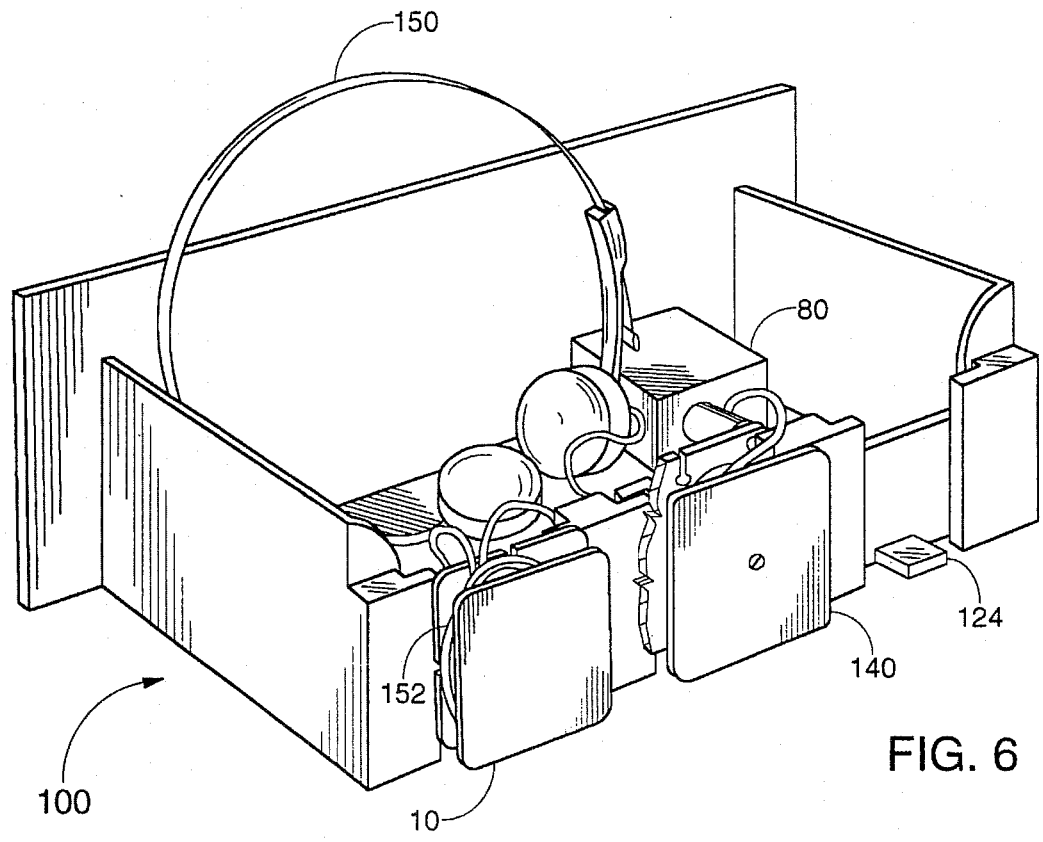
FIG. 6 is an isometric perspective view of storage bin rack 100, showing typical use of the components of the storage system of this invention, with typical appliances in typical positions as they would be stored and fitted in and on a storage bin rack.

FIG. 1a is an isometric perspective view of empty storage tool 10, without powercord, comprising retaining member 12 with non-rotating flange 14 located on one end and non-rotating flange 16 on the other end. Flange 14 contains notches 18 and 20 for securing the ends of a typical powercord not shown in FIG. 1a, to be wrapped onto retaining member 12. Rail-brackets 22 and 24 are shown as fixedly attached to flange 14 and shaped and arranged in a manner as shown in FIGS. 5-6 to match and fit within storage slot 112-114 of storage bin 100.

Figure 1B:
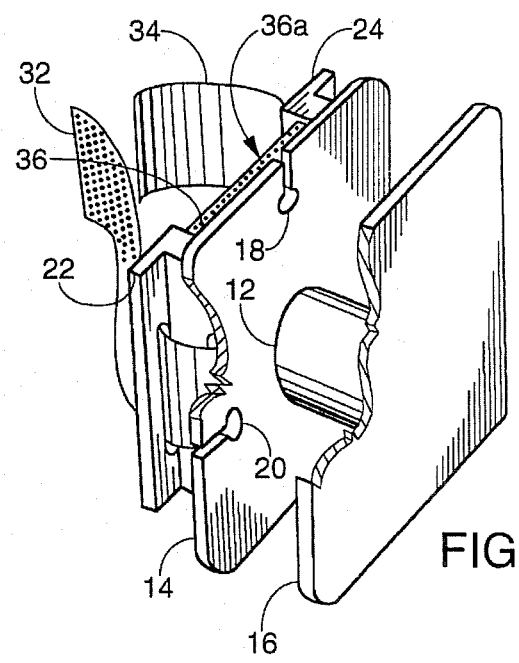
FIG. 1*b* is an isometric perspective view of non-rotatable storage tool 30, without powercord, with straps for interface attachment to appliance.
Figure 1C:
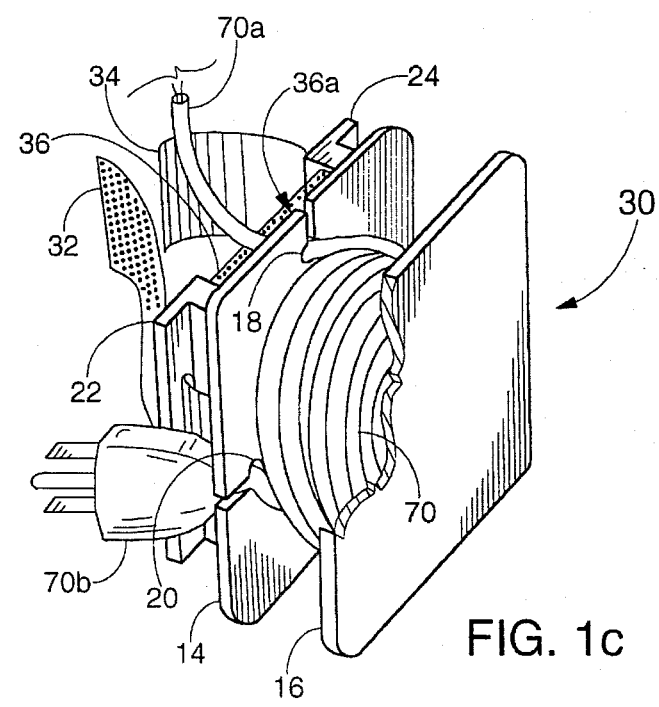
FIG. 1*c* is an isometric perspective view of tool 30, showing a typical powercord wrapped on the retaining member.

FIGS. 1b-1c are perspective views of storage tool 30, which is another embodiment of this invention. In FIG. 1b, tool 30 is empty, i.e. without powercord, and for illustration purposes, parts of flanges 14 and 16 have been cut away to show retaining member 12, as in other drawings herein. Notice that tool 30 is another embodiment of tool 10 of FIG. 1a. In tool 30, contact surface 36a has been selected for interface with a typical appliance; flange 14 is fitted, at surface 36a, with resilient interface pad 36 which may be compressed to conform to the shape of handle 74 as shown in FIG. 3; rail-brackets 22 and 24 are shaped and arranged, as shown in FIG. 3, to align with handle 74 of a typical electrical appliance 72; and contact surface 36a, as fitted with resilient, conformable pad 36, and rail-bracket rails 22 and 24, which together cooperatively form a concave interface pocket, shaped to conform to a selected portion such as a handle 74 of a selected, typical electrical appliance such as typical hairdryer 72; and flexible straps 32 and 34 are fixedly attached to flange 14 and to rail-brackets 22 and 24 respectively, as means for attaching tool 30 to handle 74, in a manner as shown in FIG. 3 wherein they may be wrapped around handle 74 and removably latched.

Figure 3:
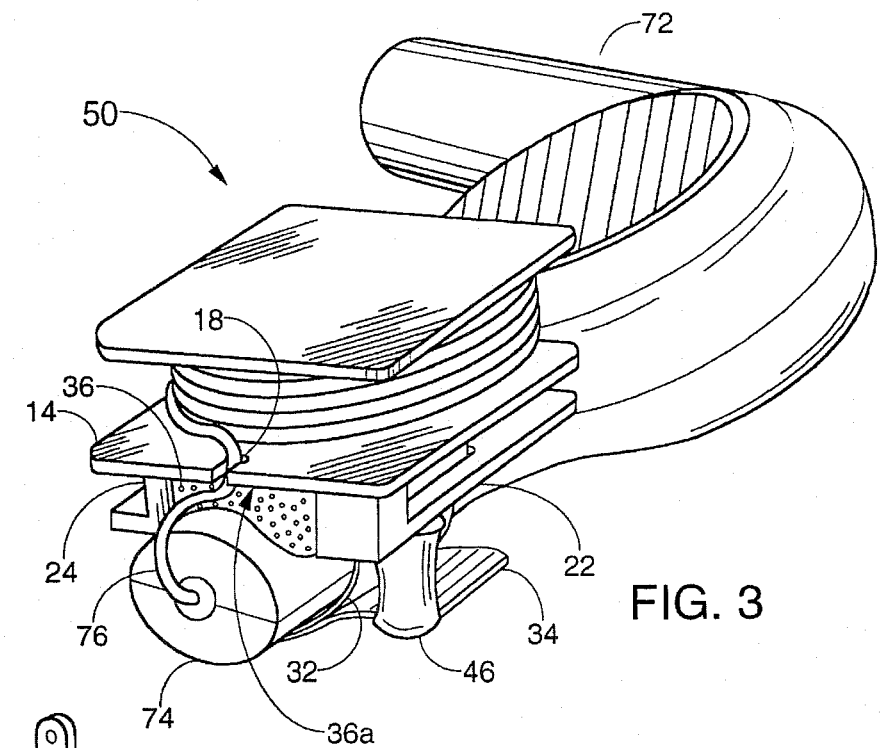
FIG. 3 is an isometric perspective view of rotatable tool 50, as it would be interfaced with and attached to the handle of a typical appliance such as an electric hairdryer.

In the preferred embodiment of FIG. 1b, means for attaching the tool 30 to handle 74 as shown in FIG. 3, is disclosed as flexible straps 32 and 34, comprising flexible, quick-acting, plastic hook-and-loop materials, but may equivalently be comprised of other attaching means well know to persons of ordinary skill in the art, such as straps with a buckle, and other equivalent means for attaching.

FIG. 1c is an isometric perspective view of tool 30 with a typical powercord 70 stored thereon, being wound between flanges 14 and 16 onto retaining member 12, which in this view is hidden beneath powercord 70. FIG. 1c illustrates that one end of powercord 70 may be removably gripped in notch 18, and the other end of powercord 70 likewise may be gripped in notch 20.

Figure 2A:
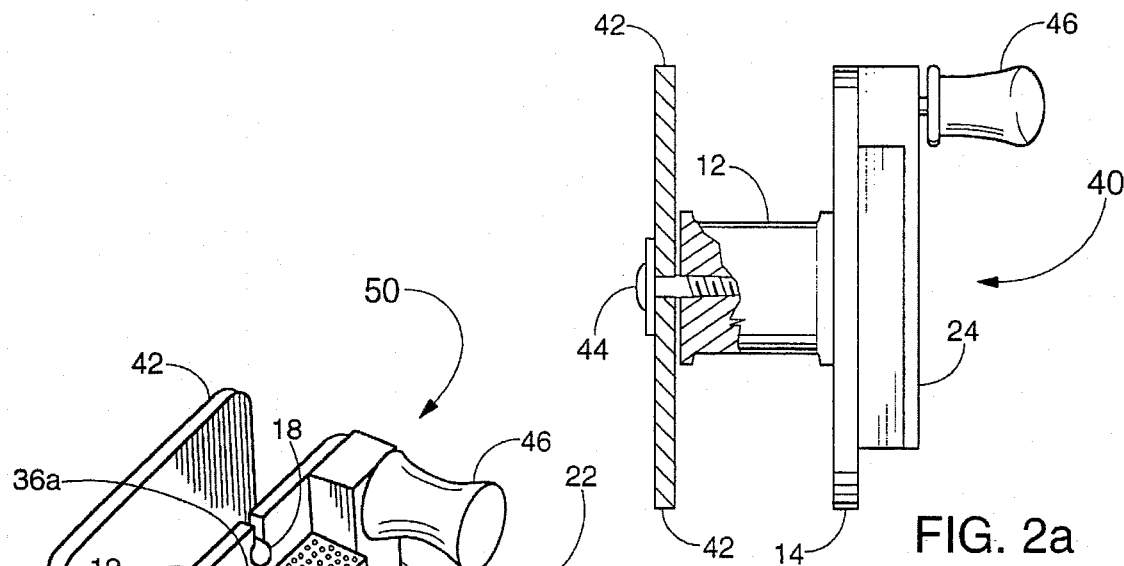
FIG. 2*a* a side view of rotatable storage tool 40 forming another embodiment of the present invention, attachable to a storage bin rack.

FIG. 2a is an illustration of rotatable storage tool 40 comprising retaining member 12 with flange 14 fixedly attached to one end of retaining member 12, and with flange 42 rotatably attached to the other end of retaining member 12 by means of pivot pin 44. Knob handle 46 is rotatably attached to an outside portion of flange 14 as means for manually rotating flange 14 and retaining member 12 about pivot pin 44 with respect to flange 42. Rail-bracket 24, and likewise typical rail-bracket 22 which is not visible in this view of FIG. 2a, are fixedly attached to flange 14, as means for fitting tool 40 into matching slot 112-114 of a storage bin 100 as shown in FIG. 5.

Figure 2B:
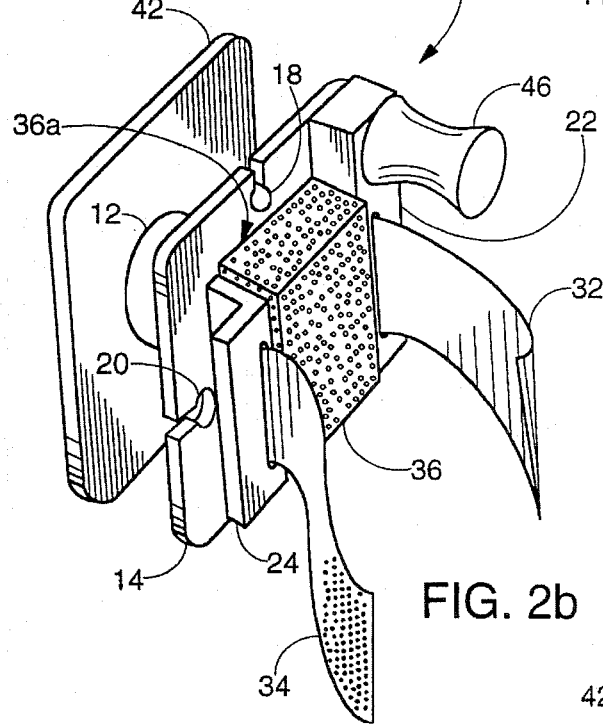
FIG. 2 is an isometric perspective view of rotatable storage tool 50, as another embodiment of tool 40, but with quick-acting, hook-and-loop straps for interface attachment to a typical appliance.
FIG. 2*c* is likewise an isometric perspective view of tool 50, showing a typical powercord wrapped on the retaining member.

FIG. 2b shows rotatable storage tool 50 as another embodiment of this invention, wherein tool 50 is similar to rotatable tool 40 of FIG. 2a. In tool 50, rail-brackets 22 and 24 are arranged, as shown in FIG. 3, to align with handle 74 of a typical electrical appliance 72; resilient interface pad 36 is fitted and fixedly attached to flange 14 at surface 36a between rail-brackets 22 and 24; is made of resilient material such as plastic sponge; and may be compressed to conform to the shape of handle 74 as shown in FIG. 3; and contact surface 36a as fitted with resilient, conformable pad 36 and side rails 22 and 24, together form a concave interface pocket, shaped to conform to a selected portion such as a handle 74 flexible straps 32 and 34 are fixedly attached to flange 14 and to rail-brackets 22 and 24 respectively, in a manner as shown in FIG. 2b wherein they may be wrapped around handle 74 and removably latched, as shown in FIG. 3.

In FIG. 2b, means for attaching the tool 50 to handle 74 as shown in FIG. 3, is disclosed as flexible straps 32 and 34, comprising flexible, quick-acting, plastic hook-and-loop materials; but the attaching means may equivalently be comprised of other attaching means well know to persons of ordinary skill in the art, such as flexible straps with a buckle, clamps, gripping hardware, and other equivalent means for attaching.

Figure 2C:
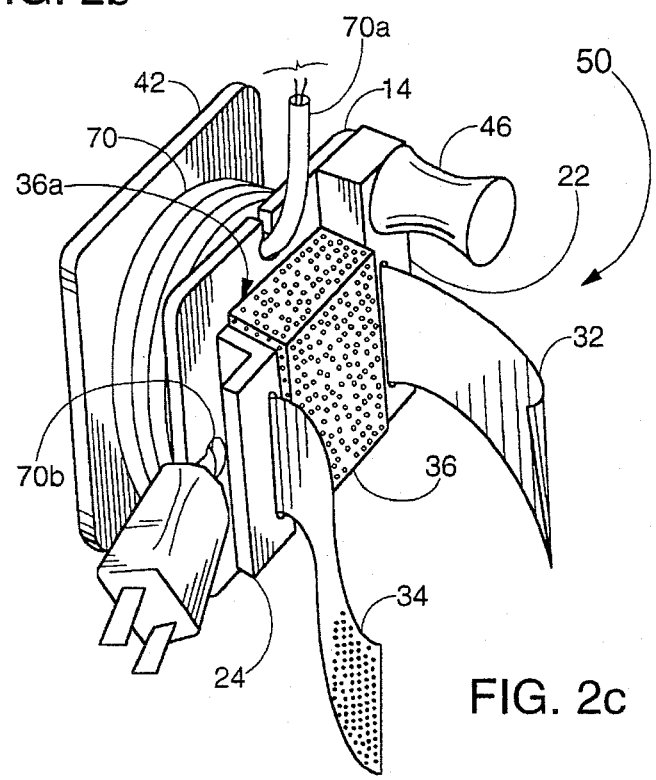

FIG. 2c of rotatable storage tool 50, shows how a typical powercord 70 may be stored thereon by winding it onto retaining member 12 between flanges 14 and 16, illustrating that one end of powercord 70 may be removably gripped in notch 18, and the other end likewise gripped in notch 20.

FIG. 3 illustrates rotatable storage tool 50 as interfaced and fitted onto typical handle 74 of a typical appliance 72, by means of rail-brackets 22 and 24 and resilient interface pad 36 which resiliently conforms to the shape of handle 74 as shown in FIG. 3, and as removably attached to handle 74 by attaching means well known in the art such as straps 32 and 34 which are in this embodiment comprised of flexible, quick-acting, plastic hook-and-loop materials.

Figure 4:
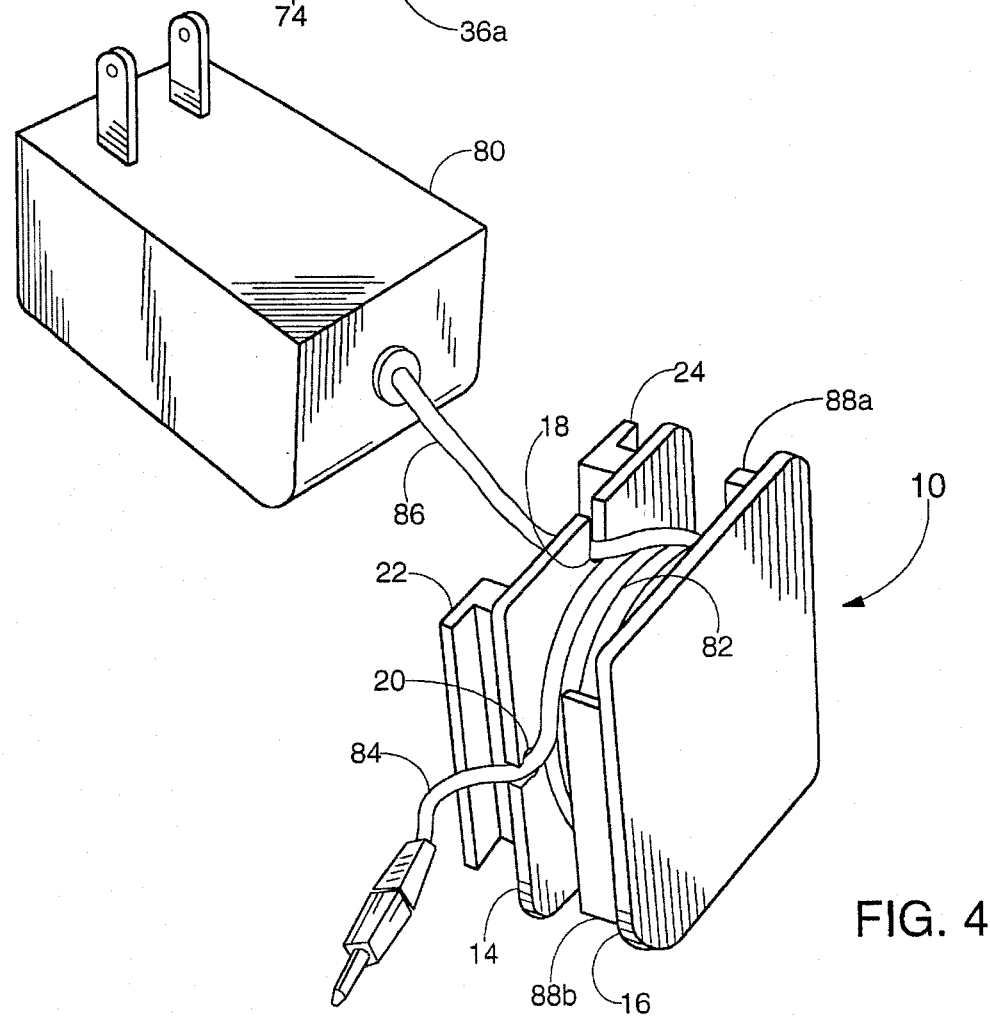
FIG. 4 is an isometric perspective view of non-rotatable tool 10, with rail-bracket rails for a storage rack, showing the powercord and converter, of an appliance requiring conversion from AC to DC power, with the converter end of said cord gripped in a notch in one of the flanges.

FIG. 4 is an illustration of storage tool 10 as disclosed in this invention, showing how tool 10 will be used to store a typical powercord 82 for a typical appliance such as converter 80 by wrapping powercord 82 about retaining member 12, which in this view is hidden beneath powercord 82, wound between flanges 14 and 16, with the converter end 86 of said powercord 82 gripped in notch 18 and the plug end 84 gripped in notch 20. It will be apparent as disclosed in this invention, that other embodiments such as storage tools 10, 30, 40 and 50, and other equivalent embodiments, will likewise be useable for storage of powercords of other small electric appliances and electronic appliances, including powercords with adapters, converters and recharging devices fixedly attached such as converter 80.

FIG. 4 also shows how a pair of finger grips 88a and 88b may be affixed to the inside face of opposing edges of flange 16, for ease of holding tool 10 in one hand while powercord 82 is manually wound onto retaining member 12 not shown in this view of FIG. 4. Equivalently, said finger grips 88a and 88b may be likewise affixed to flange 16 of tool 30, and equivalently, likewise affixed to flange 42 on tool 40, and equivalently tool 50, for ease of holding in one hand.

FIG. 5 illustrates storage bin 100, comprised of back 102, right side 104, left side 106, bottom 108, and front 110, which in turn is fitted with left T-flange 112, left-center T-flange 114, right-center T-flange 116, and right T-flange 118, which are each shaped and arranged as shown in FIG. 5 to form matching slots 112-114, 114-116, and 116-118, respectively. The bottom of each slot 112-114, 114-116, and 116-118, is each respectively closed with stops 120, 122, and 124.

In FIG. 5, tool 10 and tool 140 are shown for purposes of schematic illustration as schematically suspended above and aligned with slots 112–114 and 114–116, respectively, into which they each may be fitted for storage, as shown in FIG. 6. Notice in the embodiment of tool 140 as shown in FIGS. 5–6, tool 140 is similar to rotatable storage tool 40 of FIG. 2a.

FIG. 6 shows an additional view of storage bin 100 as disclosed in this embodiment, holding storage tool 10 fitted into slot 112–114, with powercord 152 of typical small electronic appliance such as earphone-headset 150 wound onto storage tool 10, and in turn, earphone-headset 150 is stored within bin 100. Likewise, FIG. 6 shows storage bin 100 holding storage tool 140 with powercord 82 wrapped thereon of typical small electronic appliance such as converter 80, which in turn is stored within storage bin 100, while rail-brackets are fitted within slot 114–116.

To assure complete disclosure, although in some places redundant, it is emphasized that the rotatable storage tool 50 attaches to typical handle 74 of typical electric hairdryer 72 without requiring modification of the hairdryer in any manner. Storage tool 50 with typical powercord 76 wound thereon, interfaces with and is attached to handle 74 of typical hair dryer appliance 72, and attaches thereto of its own means. It will be apparent that rotatable storage tool 50 as shown in FIGS. 2b, 2c, and 3, is fitted with rail-brackets 22 and 24 which are arranged to interface and fit within slot 112–114, and equivalently with slots 114–116, and equivalently with slot 116–118, of storage bin 100 of FIG. 5. Thus rotatable storage tool 50 with typical powercord 70 wound thereon, may be stored by fitting it into slots 116–118 in a manner equivalently shown for tools 10 and 140 in FIG. 6.

In FIGS. 2b, storage tool 50 comprises retaining member 12, with first flange 14 fixedly attached to one end of said retaining member 12. Second flange 42 is rotatably attached, by means of pivot pin 44, which is not visible in views of FIG. 2b and 2c, to the other end of retaining member 12. A first notch 18 is located on first flange 14, for gripping an end of typical powercord 70. A second notch 20 is likewise located in first flange 14 for gripping another end of typical powercord 70. Notches 18 and 20 may be any equivalent gripping, cleating or wedging means for securing the cord 70 to retaining member 12 to prevent unwinding. Retaining member 12 is shaped to receive power cord 70 as said cord 70 is wound onto the storage tool 50.

Knob handle 46 is rotatably attached near the perimeter of non-rotatable first flange 14. Knob 46 is used for manually rotating retaining member 12, with its fixedly attached flange 14, about pivot pin 44 with respect to rotatable flange 42.

An interface contact surface 36a is located on first flange 14. Contact surface 36a is fitted with resilient, conformable pad 36 and side rails 22 and 24, which together form a concave interface pocket, shaped to conform to a selected portion such as a handle 70 of a selected, typical electrical appliance such as typical hairdryer 72.

A pair of straps 32 and 34 are affixed to first flange 14 in a manner to include two opposing sides of contact surface 36a. The loose strap ends 32 and 34 are configured and arranged to be capable of being selectively wrapped and latched around a selected portion such as handle 74 of typical appliance 72 as shown in FIG. 3. Straps 32 and 34 may be made of conventional strap material such as fabric, leather or plastic, and may be fitted with conventional fasteners such as snaps, buckles and equivalent fitting means. In this embodiment, straps 32 and 34 are made of plastic, quick-latching, multiple hook and compatible multiple loop material fastener means of a type conventionally sold under the Velcro® trademark, which is capable of quick attachment and release. Retaining member 12, flanges 14 and 16, pivot pin 44, knob 46, and rail-brackets 22 and 24 may be made of any conventional manufacturing materials of adequate strength for fabrication or casting, such as wood, metal, and equivalently plastic. In a preferred embodiment, these parts are made of plastic, for ease and economy of manufacture, and for strength and light weight. Pad 36 may be made of conventional, light weight resilient materials such as sponge rubber, plastic and the like.

Likewise, fixed flange 14 and retaining member 12 may be of plastic cast as a unit, which may be referred to as the rotor, comprising said fixed flange 14 with retaining member fixedly attached thereto, and forming a part of said rotor.

The attachment is accomplished without modification of the appliance in any manner, and is thus readily fitted to many different small appliances. In this aspect, storage tool 50 would be manufactured to interface with the particular appliance 72, by selecting a preferred portion 74 of that appliance 72 for attachment. Contact surface 36a, pad 36, and rail-brackets 22 and 24 are shaped and arranged to conform to and fit around the shape of selected interface portion which in the FIG. 3 embodiment would be handle 74.

In still another aspect of present invention, storage tool 50 is attachable to a storage rack 100. In this embodiment, rail-brackets 22 and 24 are shaped to fit and slip into matching slots 112–114 of storage slot 100. Slots 112–114, 114–116, will receive and retain rail-brackets 22 and 24 in a manner to hold storage tool 50 in a selected stored position, for ready ease of access and orderly storage. In still another aspect, not illustrated here, it will be obvious that the capability for attachment of storage tool 50 to storage rack 60 may by omitted by not providing rails 22 and 24 on side-braces 22 and 24.

In typical usage as shown in FIGS. 2c and 2b, an operator will grasp empty storage tool 50 in one hand, holding it by flange 42. For ease of holding tool 50 in one hand, and equivalently for holding tool 40, and tool 50, in one hand, flange 42, and equivalently flange 16 of tools 10 and 30, may be fixedly equipped with finger grips 88a and 88b, as shown on flange 16 of tool 10 in FIG. 4. Press the free end of powercord 70 into first notch 18. Grasp knob 46 with the other hand, and rotate first flange 14, as affixed to retaining member 12, about pivot point 44 to wind the free length of cord 70 onto retaining member 12 between flanges 14 and 44. Press the remaining end of cord 70 into notch 20 to prevent unwinding. Place the storage tool 50 with cord 70 wound thereon into position with contact surface 36a, pad 36 and rail-brackets 22 and 24 aligned and in contact with selected portion 74 of selected appliance 72. Snugly wrap and tightly latch the loose ends of straps 32 and 34 about selected portion 74. In this manner, the powercord 70 will be stored, and storage tool 50 will be attached as an integral part of appliance 72. Alternately and selectively, storage tools 10, 30, 40, 50, and 140, may be stored in storage bin 100, and selectively attached on said racks, per FIGS. 5–6.

EQUIVALENT EMBODIMENTS INCLUDED

While the preferred embodiment, and typical alternative embodiments, of the component parts and assemblies of the storage system of this invention, have been illustrated in the accompanying drawings, and described in the Detailed Description, it will be understood that the invention is not limited to the embodiments disclosed here, but is equally capable of numerous other equivalent arrangements, rearrangements, modifications and substitutions of parts and elements, equivalently to achieve the functions, means, ways and results disclosed herein, without departing from the spirit and teaching of the invention, and are equivalently covered within this disclosure of this invention.

What I claim is:

1. An electrical powercord storage tool for retaining a powercord, for interface attachment to an electrical appliance, for storage in an electrical appliance storage bin rack, and alternatively for interface attachment to a storage bin rack as means for storing said powercord and appliance, comprising:

a base; and a retaining member attached to said base;

means on said retaining member for gripping, winding and retaining an electrical powercord comprising:
a spool, a fixed flange attached to one end of said spool, and a knob handle rotatably attached near a perimeter of said fixed flange;
said retaining member rotatably attached to said base;
first and second notches in said fixed flange;
said first notch comprising means for removably gripping one end of said powercord;
said knob comprising means for rotating said retaining member about said base for winding said powercord onto said retaining member;
said second notch comprising means for removably gripping the other end of said powercord;

means on said retaining member for interfacing with and attaching to an electrical appliance comprising:
said fixed flange further comprising a contact surface, an interface pad, and a rail-bracket on said fixed flange, all cooperatively shaped and arranged to match and interface with a portion of said electrical appliance; and
a quick-latching strap affixed to said fixed flange, removably latchable around said portion of said electrical appliance, and comprising means for quickly attaching said tool to said appliance;

means on said retaining member for interfacing with and attaching to an appliance storage bin rack, comprising:
said rack having a back, a left side, a right side, a front, and a bottom, cooperatively comprising means for receiving and holding a plurality of said appliances and powercord storage tools; and said rack further comprising:
rack means affixed to said front for interfacing with and removably attaching one or more said powercord storage tools, said rack means comprising: a plurality of slots located on said front of said rack; each said slot formed by flanges attached to said front; each said slot shaped to interface with, receive and hold said rail-bracket of said powercord storage tool; each said slot being partially closed at its bottom end by a structure affixed to said front; and
said rail-bracket on said retaining member configured to interface and fit within one of said slots on said storage bin rack.

2. A powercord storage tool according to claim 1 further comprising a pair of opposing finger grips fixedly attached, one to each of two opposing edges of said base.

3. A storage bin rack for selectively holding small electrical appliances, electrical adapters and powercord storage tools, comprising:

a container;

said container comprising a back, a left side, a right side, a front, and a bottom;

said back, left side, right side, front, and bottom cooperatively comprising means for receiving and holding a plurality of said appliances, adapters and powercord storage tools within said container;

a rail-bracket attached to at least one of said powercord storage tools;

rack means affixed to said container for interfacing with, receiving and holding at least one of said powercord storage tools on the outside of said container;

said rack means comprising at least one slot; said slot formed by opposingly matched, shaped and arranged flanges attached to said container; said slot being partially closed at its bottom by a transverse member; and said slot shaped to interface with, receive and hold said rail-bracket of said at least one powercord storage tool outside of said container.

4. A process for storage of a plurality of powercords and small electric appliances onto a powercord storage bin rack, comprising the steps of:

a. selecting a powercord storage tool having a storage retaining member, a first flange fixedly attached to one end of said retaining member, a second flange attached to the other end of said retaining member, two notches in said first flange, each notch comprising means for removably gripping one end of said powercord; said tool further comprising means for gripping, winding and retaining an electrical powercord comprising:
said second flange rotatably attached to said retaining member;
a knob handle rotatably attached near a perimeter of said fixed flange;
said first notch comprising means for removably gripping one end of said powercord;
said fixed flange, said retaining member, said rotatably attached second flange and said knob comprising means for winding said powercord onto said retaining member;
said second notch comprising means for removably gripping the other said end of said powercord as means for gripping, retaining and preventing said powercord from unwinding from said retaining member;
said tool further having interface bracket rail means for interface attaching said tool to a selected slot on a selected storage bin rack;

b. selecting a powercord storage bin rack comprising:
a back, a left side, a right side, a front, and a bottom, cooperatively comprising means for receiving and holding a plurality of said appliances, adapters and powercord storage tools, further comprising;
rack means affixed to said front for interfacing with and removably attaching one or more said powercord storage tools to said rack; said rack means comprising a plurality of slots, each said slot formed by two opposingly matched, shaped and arranged flanges fixedly attached to said front, and each said slot being partially closed at its bottom end by a structure affixed to said front; and
each said slot shaped to interface with, receive and hold the rail-bracket of said powercord storage tool;

c. winding said powercord of one of said appliances, with adapter attached, if any, onto said retaining member of said powercord storage tool;

d. pressing one end of said powercord into one of said two notches and the other end of said powercord into the other of said notches as means for gripping, retaining and preventing said powercord from unwinding from said retaining member;

e. aligning said bracket rails of said powercord storage tool with a selected said slot of said storage bin rack, and inserting said bracket rail into said slot as means for holding said tool on said rack; and f. repeating steps a through e above on each additional said powercord and said adapter, if any, until all have been stored on said storage bin rack.

5. A process for storage of a plurality of small electric appliances and their respective powercords with converters attached, if any, on a powercord storage bin rack, comprising the steps of:

a. selecting a powercord storage tool having a storage retaining member, a first flange attached to one end of said retaining member, a second flange attached to the other end of said retaining member, two notches in said first flange, each notch comprising means for removably gripping one end of said powercord; said tool further comprising means for gripping, winding and retaining an electrical powercord comprising:

said second flange rotatably attached to said retaining member;

said knob handle rotatably attached near a perimeter of said fixed flange;

said first notch comprising means for removably gripping one end of said powercord;

said fixedly attached first flange, said retaining member, said rotatably attached second flange, and said knob comprising means for winding said powercord onto said retaining member;

said second notch comprising means for removably gripping the other said end of said powercord as means for gripping, retaining and preventing said powercord from unwinding from said retaining member;

said tool further having contact surface, interface pad, rail-brackets, and one or more straps comprising means for quick latching and releasing said straps, cooperatively comprising means for interface attaching said tool to a selected portion of a selected electrical appliance;

b. selecting a powercord storage bin rack comprising:

a back, a left side, a right side, a front, and a bottom, cooperatively comprising means for receiving and holding a plurality of said appliances, adapters and powercord storage tools, further comprising;

rack means affixed to said front for interfacing with and removably attaching one or more said powercord storage tools to said rack, said rack means comprising a plurality of slots, each said slot formed by two opposingly matched, shaped and arranged flanges fixedly attached to said front, and each said slot being partially closed at its bottom end by a structure affixed to said front; and each said slot shaped to interface with, receive and hold the rail-bracket of said powercord storage tool;

c. selecting said powercord with adapter attached, if any, of a selected electrical appliance;

d. winding said powercord of said selected appliance, with adapter attached, if any, onto said retaining member of said powercord storage tool;

e. pressing one end of said powercord into one of said two notches and the other end of said powercord into the other of said notches as means for gripping, retaining and preventing said powercord from unwinding from said retaining member;

f. aligning and interfacing said contact surface, rail-brackets, interface pad, and straps into contact with said selected portion of said selected electrical appliance;

g. wrapping and drawing tightly said straps around said selected portion, and latching said straps;

h. placing said electrical appliance with powercord storage tool attached, into a said electrical appliance storage bin rack; and i. repeating steps a through h above on each additional said appliance, said powercord and said adapter, if any, until all have been stored on said storage bin rack.

6. An electrical powercord storage tool and storage bin rack for retaining a powercord, for interface attachment of said tool and powercord to an electrical appliance, for storage of said tool, powercord and appliance in an appliance storage bin, and alternatively for interface attachment of said tool, powercord and appliance to a storage bin rack as means for storing said powercord and appliance, comprising:

a base;

a retaining member attached to said base; and an appliance storage bin rack;

means on said retaining member for gripping, winding and retaining an electrical powercord, comprising:

a spool, a fixed flange attached to one end of said spool, and a knob handle rotatably attached near a perimeter of said fixed flange;

said retaining member rotatably attached to said base;

first and second notches in said fixed flange;

said first notch comprising means for removably gripping one end of said powercord;

said knob comprising means for rotating said retaining member about said base for winding said powercord onto said retaining member;

said second notch comprising means for removably gripping the other said end of said powercord;

means on said retaining member for interfacing with and attaching to an electrical appliance, comprising:

said fixed flange further comprising a contact surface, an interface pad, and a rail-bracket on said fixed flange cooperatively shaped and arranged to match and interface with a portion of said electrical appliance; and a quick-latching strap affixed to said fixed flange, removably latchable around said portion of said electrical appliance, and comprising means for quickly attaching said tool to said appliance;

said appliance storage bin rack comprising:

a back, a left side, a right side, a front, and a bottom, cooperatively comprising means for receiving and holding a plurality of said appliances, adapters and powercord storage tools, further comprising;

rack means affixed to said front for interfacing with and removably attaching one or more said powercord storage tools to said rack, said rack means comprising a plurality of slots, each said slot formed by two opposingly matched, shaped and arranged flanges fixedly attached to said front, and each said slot being partially closed at its bottom end by a structure affixed to said front; and each said slot shaped to interface with, receive and hold said rail bracket of said powercord storage tool; and means on said retaining member for attachment to said appliance storage bin rack, comprising said rail-bracket on said retaining member configured to interface with and fit within one of said slots on said storage gin rack.

* * * * *